(12) United States Patent
Imahashi et al.

(10) Patent No.: US 6,682,801 B2
(45) Date of Patent: Jan. 27, 2004

(54) FLAME-RETARDANT LAMINATED RESIN MOLDED ARTICLE

(75) Inventors: Takeshi Imahashi, Takamatsu (JP); Makoto Yoshii, Takamatsu (JP); Yoshiharu Sawa, Takamatsu (JP)

(73) Assignee: Kyowa Chemical Industry Co., Ltd., Kagawa-ken (JP)

( * ) Notice: Subject to any disclaimer, the term of this patent is extended or adjusted under 35 U.S.C. 154(b) by 0 days.

(21) Appl. No.: 09/450,268

(22) Filed: Nov. 26, 1999

(65) Prior Publication Data
US 2003/0162011 A1 Aug. 28, 2003

(30) Foreign Application Priority Data

Dec. 7, 1998 (JP) ............................................. 10-347088
Jan. 21, 1999 (JP) ............................................. 11-013524

(51) Int. Cl.$^7$ .............................. B32B 7/02; B32B 5/22
(52) U.S. Cl. ........................ 428/90; 428/213; 428/323; 428/328; 428/330; 428/500; 428/515; 428/516; 428/920; 428/921
(58) Field of Search ................................ 428/323, 213, 428/328, 330, 516, 920, 921, 90, 500, 515

(56) References Cited

U.S. PATENT DOCUMENTS

| | | | | |
|---|---|---|---|---|
| 4,076,878 A | * | 2/1978 | Norby ........................ | 428/921 |
| 5,194,184 A | * | 3/1993 | Takeyama et al. .......... | 242/609 |
| 5,418,272 A | * | 5/1995 | Kawabata et al. .......... | 524/436 |
| 5,438,084 A | * | 8/1995 | Imahashi ..................... | 523/440 |
| 5,444,809 A | * | 8/1995 | Aoki et al. .................. | 428/921 |
| 6,130,282 A | * | 10/2000 | Imahashi et al. ........... | 524/436 |
| 6,146,557 A | * | 11/2000 | Inata et al. .................. | 252/609 |

FOREIGN PATENT DOCUMENTS

| | | |
|---|---|---|
| EP | 0 731 136 | 9/1996 |
| EP | 0 780 425 | 6/1997 |
| EP | 0 953 599 | 11/1999 |

* cited by examiner

*Primary Examiner*—Monique R. Jackson
(74) *Attorney, Agent, or Firm*—Wenderoth, Lind & Ponack, LLP

(57) ABSTRACT

The coloring problem of a conventional molded article is overcome while retaining the advantages of high strength and high flame retardancy of the molded article when a metal hydroxide is used in combination with red phosphorus and carbon powder in the method of imparting a synthetic resin with flame retardancy. The molded article can be colored in any color and exhibits decreased lowering of electric insulation resistance when submerged. The molded article comprises a base material colored from dark red to black containing 100 wt parts synthetic resin, 5–200 wt parts metal hydroxide, 1–30 wt parts red phosphorus and 0.1–30 wt parts carbon powder; and a skin layer laminated thereon masking a colored surface of the base wherein the skin layer contains 100 wt parts, 0–100 wt parts pigment, and 0–200 wt parts metal hydroxide, provided that the total amount of pigment and metal hydroxide in the skin layer is at least 0.001 wt parts.

18 Claims, No Drawings

FLAME-RETARDANT LAMINATED RESIN MOLDED ARTICLE

FILED OF THE INVENTION

The present invention relates to a molded article of a synthetic resin filled with a halogen-free flame retardant. More specifically, it relates to a high-strength and highly flame-retardant molded article comprising a base material formed of a composition containing a synthetic resin, a metal hydroxide, red phosphorus and a carbon powder and colored in a color range of from dark red to black and a skin layer laminated thereon. In the above molded article, the surface color of the base material is masked with the skin layer, the color tone of the molded article can be modified to a color as required, and a decrease in electric insulation resistance of the molded article is small when the molded article is submerged.

PRIOR ART OF THE INVENTION

In the fields of molded articles formed of a resin composition containing a halogen-free flame retardant, it is old-established practice to use metal hydroxide as a flame retardant. Since metal hydroxides such as magnesium hydroxide and aluminum hydroxide are white, a molded article can be colored with a colorant as required, and the demand of these metal hydroxides is expected to expand in the future since they are safe flame retardants. However, the defect of the above metal hydroxides is that they have a small effect on imparting flame retardancy, and for imparting a synthetic resin with sufficient flame retardancy, it is required to fill a high density of the above flame retardant, or it is required to incorporate approximately 100 parts by weight of the flame retardant or more per 100 parts by weight of the synthetic resin. The use of such a high density of the metal hydroxide in a synthetic resin considerably downgrades the inherent mechanical strength and surface appearance of the synthetic resin in many cases. Actually, therefore, fields where the above metal hydroxides are usable as a flame retardant for a synthetic resin are limited.

For overcoming the above problem, there has been long proposed a method in which a synthetic resin is improved in flame retardancy by incorporating red phosphorus or a carbon powder as a flame retardant aid in combination with the metal hydroxide. According to this method, halogen-free flame redardants alone are used, and there can be produced a molded article of a synthetic resin having high strength and high flame retardancy equivalent to those of a molded article of a PVC resin or a resin filled with a halogen-containing flame retardant. When red phosphorus or a carbon powder is used, however, a molded article is colored in dark red or black, and there are caused problems that the use of the molded article is limited in applicable field and that the molded article extremely decreases in electric insulation resistance when submerged. For overcoming the coloring problem of the red phosphorus, JP-B-7-30326 and JP-A-6-128413 propose a method in which the red phosphorus is surface-coated with an inorganic pigment such as titanium oxide or zinc sulfate for masking the dark red color of the red phosphorus. That is, a whitened red phosphorus is proposed.

In the above method, red phosphorus can be whitened to some extent. However, the whitening is not sufficient, and a molded article formed of a resin composition containing the above whitened red phosphorus has a pinkish white color, so that the color of a molded article cannot be modified to an intended sufficiently white. It is therefore very difficult to completely color the molded article in an intended color by adding a colorant. Further, for whitening red phosphorus, it is required to incorporate a large amount of colorants such as titanium oxide and zinc sulfate. The actual problem is therefore that the content of red phosphorus decreases, so that the effect that the red phosphorus imparts a synthetic resin with flame retardancy decreases to a great extent.

SUMMARY OF THE INVENTION

Under the above circumstances of prior art methods, it is an object of the present invention to completely overcome the coloring problem of a molded article surface in the prior art methods while retaining the advantages of high strength and high flame retardancy of a molded article when a metal hydroxide is used in combination with red phosphorus and a carbon powder in the method of imparting a synthetic resin with flame retardancy.

It is another object of the present invention to decrease the lowering of the electric insulation resistance of a molded article when the molded article is submerged.

According to the present invention, there is provided a molded article which is colored in any color, which has high strength and high flame retardancy and which exhibits the decreased lowering of electric insulation resistance when submerged, the molded article comprising a base material A colored in a color of from dark red to black and a skin layer B laminated thereon, the skin layer B masking a colored surface of the base material A, wherein the base material A is a molded product formed of a composition containing 100 parts by weight of a synthetic resin, 5 to 200 parts by weight of a metal hydroxide, 1 to 30 parts by weight of red phosphorus and 0.1 to 30 parts by weight of a carbon powder, and the skin layer B is a molded product formed of a composition containing 100 parts by weight of a synthetic resin, 0 to 100 parts by weight of a pigment and 0 to 200 parts by weight of a metal hydroxide, provided that the total amount of the pigment and the metal hydroxide in the skin layer B is at least 0.001 part by weight.

DETAILED DESCRIPTION OF THE INVENTION

The molded article of the present invention is constituted of the above base material A and the above skin layer B. The base material A is basically a molded article having high strength and high flame retardancy. However, it has a surface colored in a color of from dark red to black, and it shows a great decrease in electric insulation resistance when submerged. The skin layer B is used for masking the surface color of the base material A and preventing a decrease in electric insulation resistance when the molded article is submerged. Further, when the entire surface of the base material A is covered with the skin layer B, the phosphine odor inherent to a molded article containing red phosphorus can be completely prevented. In the present invention, the method of laminating or stacking the base material A and the skin layer B is not specially limited. The skin layer B may be laminated on the base material A by any method so long as the skin layer B covers the entire surface of the base material A. The present invention can use, for example, a method in which the base material A treated by corona discharge and the skin layer B are bonded to each other with an adhesive, a method in which the base material A and the skin layer B are laminated by co-extrusion, a method in which the base material A is skin-packed with the skin layer B, a method in which the base material A and the skin layer B which are injection-molded plates are compression-molded, a method in which the base material A and the skin layer B are laminated with a resin molded product of an adhesive resin, etc., being present between the base material A and the skin layer B, a method in which the base material A and/or the skin layer B are/is printed beforehand and these are laminated, or a method in which a stretched film (skin layer B) is laminated on the base material A. Any laminating method may be used regardless of whether the method is a direct method or an indirect method, so long as the skin layer B forms a surface of a molded article. Further, the form of the molded article is not limited. There are many cases where it is difficult to laminate the base material A and the skin layer B due to their poor adhesion. In such cases, preferably, the base material A and the skin layer B are discharge-treated for easier lamination. The discharge method includes a corona discharge method and a glow discharge method. The discharge treatment is not necessarily required when the base material A and the skin layer B are easily bonded to each other by a heat diffusion method, or the like. The discharge treatment remarkably improves the adhesion between the base material A and the skin layer B, and the laminatability of the base material A and the skin layer B is remarkably improved.

In the above-produced laminated molded article, the color of the base material A, which is a color of from dark red to black, is completely masked, the molded article can be colored in any color as required, and the decrease in the electric insulation resistance of the molded article when it is submerged can be prevented. That is, the present invention can successfully provide a molded article which can be colored in any color as required with retaining the advantages, high strength and high flame retardancy, of the substrate A, and which shows almost no decrease in electric insulation resistance when submerged.

Generally, the flame retardancy of a molded article formed of a synthetic resin composition decreases with a decrease in thickness. When the thickness of the molded article of the present invention decreases to excess, it is similarly difficult to impart the molded article with flame retardancy. Therefore, the total thickness of the base material A and the skin layer B is at least 20 $\mu$m, preferably at least 50 $\mu$m, more preferably at least 100 $\mu$m. The molded article of the present invention has high flame retardancy, and the high flame retardancy is produced by the base material A. The skin layer B has lower flame retardancy than the base material A since the skin layer B contains no red phosphorus as a flame retardant aid. For retaining the high flame retardancy, therefore, it is preferred to increase the thickness of the base material A so as to make it as large as possible and to decrease the thickness of the skin layer B so as to make it as small as possible within the thickness range of the molded article within which the color of the base material A can be masked and the decrease in the electric insulation resistance of the molded article when the molded article is submerged can be prevented. That is, the thickness of the skin layer B is 3 times or less, preferably twice or less, the thickness of the base material A.

According to the present invention, further, there is also provided a velvet-like fiber-implanted article formed by implanting a synthetic fiber or a natural fiber on the molded article formed of the base material A and the skin layer B laminated thereon. The implantation can be carried out by an electrostatic implantation (flocky processing) method. For example, an adhesive is applied to the surface of the molded article of the present invention in advance, and short fibers (piles) which are electrically charged with a several-tens-thousand volt direct-current high-voltage generator are allowed to adhere to the surface by electrostatic attraction. All the piles adhere to the surface of the molded article perpendicularly to the surface, so that a velvet-like fiber-planted article can be obtained. After the implantation, the adhesive is dried to give the article as an end product. Piles colored with a dye or a pigment may be used.

The synthetic resin for the base material A and the skin layer B in the present invention includes polyolefin resins such as linear low-density polyethylene, low-density polyethylene, ultra-low-density polyethylene, ultra-macromolecular polyethylene, an ethylene-propylene copolymer, polypropylene, an EVA resin, an EEA resin, an EMA resin and an EAA resin, polystyrene resins such as polystyrene, an ABS resin, an AAS resin, an AS resin and an MBS resin, polyamide resins such as nylon 6, nylon 66, nylon 12, nylon 46 and nylon 11, and thermoplastic resins such as a vinyl acetate resin, an acrylic resin, polyacetal, polycarbonate, a cellulose resin, a polyester resin (PET, PBT), a phenoxy resin, a polyurethane resin, an ionomer resin and a thermoplastic elastomer. Further, the above synthetic resin includes thermosetting resins such as an epoxy resin, a phenolic resin, a melamine resin, an unsaturated polyester resin, an alkyd resin and a urea resin, and synthetic rubbers such as EPDM, butyl rubber, isoprene rubber, SBR, NIR, urethane rubber, butadiene rubber, acryl rubber and silicone rubber.

Of the above synthetic resins, polyolefin resins and polystyrene resins are particularly preferred since they have an excellent property balance with a metal hydroxide, red phosphorus, a carbon powder and a pigment for attaining flame retardancy, mechanical strength and prevention of a decrease in electric insulation resistance when the molded article is submerged. The synthetic resin used in the present invention is not limited by the process for the production of the molded article of the present invention. For example, the molded article of a polyolefin can be produced in the presence of a polymerization catalyst according to any one of a metallocene method, a Ziegler method, a Ziegler-Natta method, a Friedel-Crafts method, and a Phillips method. In the present invention, a polymer alloy compatibilizer may be used for improving the molded article in mechanical strength, flexibility and texture. The amount of the polymer alloy compatibilizer per 100 parts by weight of the synthetic resin is 50 parts by weight or less.

The above polymer alloy compatibilizer includes a maleic-anhydride-modified styrene-ethylene-butylene resin, a maleic-anhydride-modified styrene-ethylene-butadiene resin, maleic-anhydride-modified polyethylene, maleic-anhydride-modified EPR, maleic-anhydride-modified polypropyene, carboxyl-modified polyethylene, epoxy-modified polystyrene/PMMA, a polystyrene-polyimide block copolymer, a polystyrene-polymethyl methacrylate block copolymer, a polystyrene-polyethylene block copolymer, a polystyrene-ethyl acrylate graft copolymer, a polystyrene-polybutadiene graft copolymer, a polypropylene-ethylene-propylene-diene graft copolymer, a polypropylene-polyamide graft copolymer and a polyethyl acrylate-polyamide graft copolymer.

The metal hydroxide for the base material A and the skin layer B in the present invention can be selected from dihydric and trihydric hydroxides such as magnesium hydroxide and aluminum hydroxides. The metal hydroxide has a BET specific surface area of 1 to 30 m$^2$/g, preferably 3 to 10 m$^2$/g and an average secondary particle diameter, measured by a laser diffraction scattering method, of 0.3 to 10 $\mu$m, preferably 0.5 to 1.5 $\mu$m, for properly retaining the mechanical strength and surface appearance of the molded article.

One function of the skin layer B is to prevent a decrease in the electric insulation resistance of the molded article when the molded article is submerged. When a metal hydroxide having a large content of water-soluble sodium salt is contained in the skin layer B, it is difficult to achieve the above function. A metal hydroxide having a small content of water-soluble sodium salt is used in the skin layer B. The content, as sodium, of the water-soluble sodium salt is 500 ppm or less, preferably 300 ppm or less, more preferably 100 ppm or less.

The content of water-soluble sodium salt in the metal hydroxide to be used for the base material A is not so limited as the content of the water-soluble sodium salt in the metal hydroxide used in the skin layer B. However, it is preferred to use a metal hydroxide having a smaller content of water-soluble sodium salt. The content of the water-soluble sodium salt in the metal hydroxide for the base material A is twice, or less than twice, as large as the content of the water-soluble sodium salt contained in the skin layer B. That is, the content, as sodium, of the water-soluble sodium salt is 1,000 ppm or less, preferably 600 ppm or less, more preferably 200 ppm or less. When the content of the water-soluble sodium salt in the metal hydroxide in the present invention is larger than the above range, for example, the content of the water-soluble sodium salt can be decreased by the following method. That is, synthesized metal hydroxide or surface-treated metal hydroxide is fully dehydrated before it is dried, or it is dehydrated, washed with water and dried.

The metal hydroxide for use in the present invention may be surface-treated with a surface-treating agent beforehand, or metal hydroxide which is not surface-treated may be used in the present invention. When metal hydroxide which is not surface-treated is used, the melt index of a composition may decrease, or the mechanical strength of a molded article may decrease. It is therefore preferred to incorporate a higher fatty acid or an alkaline earth metal salt, zinc salt or aluminum salt thereof, and/or a coupling agent together with the metal hydroxide during the kneading or molding of a composition. The amount of the above higher fatty acid, etc., per 100 parts by weight of the metal hydroxide is preferably 10 parts by weight.

The surface-treating agent includes higher fatty acids having at least 10 carbon atoms such as stearic acid and palmitic acid or alkali metal or amine salts thereof, silane-coupling agents such as vinylethoxysilane, vinyl-tris(2-methoxy) silane, γ-methcryloxypropyltrimethoxysilane, N-phenyl-γ-aminopropyltrimethoxysilane, γ-aminopropyltrimethoxysilane, N-β-(aminoethyl)-γ-aminopropyltrimethoxysilane, β-(3,4-ethoxycyclohexyl)ethyltrimethoxysilane, γ-glycidoxy-propyltrimethoxysilane and γ-mercaptopropyltrimethoxysilane, titanate-containing coupling agents such as isopropyltriisostearoyl titanate, isopropyltris(dioctylpyrophosphate)titanate, isopropyltri(N-aminoethyl-aminoethyl)titanate, isopropyltridecylbenzenesulfonyl titanate, aluminum-containing coupling agents such as acetoalkoxyaluminum diisopropylate, and phosphoric acid partially esterified products such as acid or alkali metal salt of mono- or diester of orthophosphoric acid and stearyl alcohol. The amount of the surface-treating agent per 100 parts by weight of the metal hydroxide is 10 parts by weight or less. The above surface-treating agents may be used alone or in combination. The surface treatment can be carried out by a wet method or a dry method.

When magnesium hydroxide in an amount of approximately 80 parts by weight or more is used per 100 parts by weight of the synthetic resin for the skin layer B, it is necessary to take into consideration a surface-whitening phenomenon of a molded article. The surface-whitening phenomenon downgrades the surface appearance of a mold article and decreases the commercial value of a molded article. It is assumed that the surface whitening phenomenon is caused as follows. When a molded article formed of a composition filled with magnesium hydroxide is allowed to stand in air or in water for a long period of time, the filled magnesium hydroxide reacts with carbon dioxide gas in air or carbonic acid in water and a reaction product in the form of a magnesium carbonate compound bleeds on the molded article surface, and light is scattered from pores which are left in the molded article surface due to the above reaction of magnesium hydroxide.

For preventing the surface whitening phenomenon, it is effective to form an acid-resistant coating on the magnesium hydroxide surface with at least one member selected from the group consisting of a silicon compound, a boron compound and an aluminum compound. The agent for forming the acid-resistant coating includes sodium metasilicate, sodium orthosilicate, potassium metasilicate, potassium orthosilicate, water glass, sodium tetraborate, sodium metaborate, potassium metaborate, sodium orthoaluminate, sodium metaaluminate, potassium orthoaluminate, potassium metaaluminate, aluminum chloride, aluminum nitrate, aluminum sulfate and aluminum phosphate.

The above acid-resistant coating agent is used in an amount, as Si, B or Al, of 2 parts by weight or less per 100 parts by weight of the magnesium hydroxide. The magnesium hydroxide provided with the above acid-resistant coating may be further additionally treated with the above surface-treating agent such as a higher fatty acid, etc., for use in the present invention. The surface whitening phenomenon tends to be intensified with an increase in the content of the water-soluble sodium salt in magnesium hydroxide. It is therefore preferred to use magnesium hydroxide having a smaller content of the water-soluble sodium salt. The content, as sodium, of the water-soluble sodium salt is 500 ppm or less, preferably 300 ppm or less, more preferably 100 ppm or less.

When measured by laser diffraction scattering method, the red phosphorus used in the present invention has an average secondary particle diameter of 50 μm or less, preferably 30 μm or less, more preferably 5 μm or less. It is preferred to use surface-coated red phosphorus for inhibiting the generation of phosphine gas during combustion or under heat during processing. The surface-coated red phosphorus is preferably selected from thermosetting-resin-coated red phosphorus, olefin-coated red phosphorus, carboxylate-polymer-coated red phosphorus, aluminum-titanate-condensate-coated red phosphorus and red phosphorus coated with titanium-cobalt-composite hydrate oxide. The amount of the red phosphorus is considerably smaller than the amount of the magnesium hydroxide, so that the present invention can use red phosphorus having an average secondary particle diameter greater than that of the magnesium hydroxide to some extent. When the average secondary particle diameter of the red phosphorus is greater than 50 μm, however, the mechanical strength of a molded article may decrease or the effect on improving the flame retardancy may decrease. The amount of the red phosphorus per 100 parts by weight of the synthetic resin is 1 to 30 parts by weight, preferably 5 to 15 parts by weight. When the amount of the red phosphorus is smaller than the above lower limit, the flame retardancy of a molded article may be insufficient. When the above amount exceeds the above upper limit, the mechanical strength of a molded article may be decreased. Further, red phosphorus is expensive as compared with metal hydroxide, and it is not economical to incorporate a large amount of red phosphorus.

In the present invention, a carbon powder is used for improving the molded article in flame retardancy. The carbon powder includes carbon black, activated carbon and graphite. Carbon black is particularly preferably used since it has a small particle diameter and is less expensive. The carbon black can be selected from those produced by an oil furnace method, a channel method, a gas furnace method, a thermal method, a lamp method and an acetylene method. The amount of the carbon powder per 100 parts by weight of the synthetic resin is 0.1 to 30 parts by weight, preferably 1 to 10 parts by weight. When the amount of the carbon powder exceeds the above upper limit, the mechanical strength of a molded article may be decreased. When the above amount is smaller than the above lower limit, the effect on improving the flame retardancy is low. The total amount of the metal hydroxide, red phosphorus and carbon powder used in the base material A in the present invention is 260 parts by weight per 100 parts by weight of the synthetic resin. When the above total amount exceeds 260 parts by weight, the mechanical strength of a molded article may be decreased.

The amount of the metal hydroxide for use in the base material A per 100 parts by weight of the synthetic resin is 5 to 200 parts by weight, preferably 10 to 100 parts by weight. When the amount of the metal hydroxide is smaller than the above lower limit, the flame retardancy of a molded article may be insufficient. When the above amount exceeds the above upper limit, the mechanical strength of a molded article may be decreased. Two or more metal hydroxides may be used.

The amount of the metal hydroxide for use in the skin layer B per 100 parts by weight of the synthetic resin is 0 to 200 parts by weight, preferably 10 to 100 parts by weight. In principle, the skin layer B works to mask the color of the base material A and to prevent a decrease of electric insulation resistance of a molded article when the molded article is submerged. The present invention therefore includes an embodiment in which the skin layer B contains no metal hydroxide. For imparting a molded article with higher flame retardancy, however, it is advantageous to incorporate 10 parts by weight or more of the metal hydroxide into the skin layer B. When no metal hydroxide is used in the skin layer B, at least 0.001 part by weight of a colorant is used. When the amount of the metal hydroxide exceeds 200 parts by weight, the mechanical strength of a molded article may be decreased or the surface whitening phenomenon may intensify.

The pigment for use in the skin layer B includes a white pigment, a black pigment, yellow pigment, an orange pigment, a red pigment, a violet pigment, a blue pigment, a green pigment and a metal powder pigment. The white pigment includes titanium oxide, flowers of zinc, barium sulfate, calcium carbonate, basic lead carbonate and lithopone. The black pigment includes carbon black, iron black and aniline black. The yellow pigment includes Chrome Yellow, Cadmium Yellow, iron oxide yellow, ocher, Benzidine Yellow, Hansa Yellow, Oil yellow 2G, zinc chromate, Titanium Yellow, Anthraquinone Yellow, Permanent Yellow HR, Chromophthal Yellow 6G, Chromophthal Yellow 3G and Chromophthal GR. The orange pigment includes Reddish Chrome Yellow, Chromium Vermillion, Cadmium Orange, Pyrazolone Orange and Pelinon Orange. The red pigment includes Colcothar, Cadmium Red, Permanent Red 4R, Pyrazolone Red, Lake Red C, Brilliant Carmine, Mercury Red, Pigment Scarlet 3B, Bordeaux 10B, Bon Maroon, Oil Red, Permanent Red 5FR, Quinacridon Red, Thioindigo Maroon, Lithol Red, Alizarin Lake, Red Lead and Pigment Red B. The violet pigment includes Cobalt Violet, Mineral Violet, Anthraquinone Violet and Dioxane Violet. The blue pigment includes ultramarine, Iron Blue, Cobalt Blue, Phthalocyanine Blue, Anthraquinone Blue and Indanthrene Blue. The green pigment includes Phthalocyanine Green and Chromium Oxide Green. The metal powder pigment includes an aluminum powder, a bronze powder and a pearl essence powder. The amount of the pigment for use in the skin layer B is 0 to 100 parts by weight preferably 0.001 to 100 parts by weight of the synthetic resin.

When no pigment is used, metal hydroxide is used in the skin layer B and the skin layer B masks the base material A. The metal hydroxide has low masking capability. When the metal hydroxide alone is used, the amount of the metal hydroxide is preferably at least 1 part by weight per 100 parts by weight of the synthetic resin. Further, the above pigments may be used alone or in combination. Moreover, before use, the pigment may be surface-treated with the above surface treating agent explained with regard to the surface treatment of the metal hydroxide.

The base material A and the skin layer B of the flame-retardant laminated resin molded article of the present invention may contain a generally used additive, reinforcing material and filler so long as the object of the present invention is not impaired. Examples of the above additive, etc., include an antioxidant, an ultraviolet absorbent, a photo-stabilizer, a crosslinking agent, a heat stabilizer, a metal inactivating agent, a lubricant, a nucleating agent, a foaming agent, a deodorant, wood flour, a glass fiber, fibrous magnesium hydroxide, fibrous basic magnesium sulfate, calcium silicate, alumina, a glass powder, graphite, silicon carbide, silicon nitride, boron nitride, aluminum nitride, a carbon fiber, a graphite fiber, a silicon carbide fiber.

The methods of mixing, filling and molding for the production of the base material A and the skin layer B of the flame-retardant laminated resin molded article of the present invention are not specially limited, and any methods may be employed so long as uniform mixing, filling and molding can be carried out. For example, the above components and other additive, etc., are mixed beforehand and the mixture is directly molded. When the mixture cannot be directly molded, the mixture is melt-kneaded in a twin-screw extruder, a single-screw extruder, a Banbury mixer, an open roll or the like and then the molten composition is molded by blown film extrusion, injection molding, extrusion molding, vacuum molding, blow molding, press molding, rotary molding, calender molding, or the like. Further, the molded article obtained in the present invention can be also used in a state where it is attached to other material such as a gypsum board, a wood, a composition board, a metal material or a stone material.

The present invention will be explained in detail with reference to Examples hereinafter. In Examples, a BET specific surface area, an average secondary particle diameter, electric insulation resistance, tensile strength at breaking point, elongation at breaking point, flame retardancy, surface whitening phenomenon, a color and a content of water-soluble sodium salt in metal hydroxide were measured by the following methods.

(1) Specific surface area according to BET method: Measured with a 12-sample automatic measuring apparatus, Malti-sorb 12 supplied by Yuasa Ionics K.K.

(2) Average secondary particle diameter (magnesium hydroxide, aluminum hydroxide): Measured with a microtrack supplied by Leed & Nortrup Instruments Company.

9

(red phosphorus): Measured with a laser diffraction scattering method particle size distribution measuring machine LA-90 supplied by Horiba Seisakusho.

(3) Color: A molded article was visually observed immediately after molded.

(4) Tensile strength at a breaking point and elongation at a breaking point: Metallocene LLDPE and EEA resin were measured according to JIS K 6760, and other resins were measured according to JIS K 7113. The metallocene LLDPE and the EEA resin were measured at a test rate of 200 mm/minute, and the other resins were measured at a test rate of 50 mm/minute.

(5) Flame retardancy: Measured according to JIS D 1201 or the UL94 method. In measurement according to JIS D 1201, a test piece was held with a holder having a metal wire.

(6) Surface whitening phenomenon: A metallocene LLDPE test piece having a thickness of 200 μm and side lengths of 5 cm or a test piece formed of other resin having a thickness of 3.2 mm or 6.4 mm and side lengths of 5 cm was immersed completely in 500 ml of deionized water, and while carbon dioxide gas was blown into the water, the test piece was left in the water at 24° C. for 96 hours. Then, the test piece was taken out. The test piece was visually observed to determine a degree of its surface whitening phenomenon on the basis of the following ratings.

1st grade: No surface whitening phenomenon was observed.

2nd grade: Slight surface whitening phenomenon was observed.

3rd grade: Surface whitening phenomenon was observed to some extent.

4th grade: Considerable surface whitening phenomenon was observed.

5th grade: Marked surface whitening phenomenon was observed on the entire surface of a test piece.

The levels of 1st to 3rd grades implies that a practical effect on the prevention of the surface whitening phenomenon was produced, and the levels of 1st and 2nd grades are particularly preferred. The above test shows the acceleration of a condition where a molded article is naturally placed in air or water.

(7) Electric insulation resistance: A test piece having side lengths of 10 cm and a thickness of 2.4 mm, 3.2 mm or 6.4 mm was immersed in deionized water at 90° C. for 10 weeks. After the 10 weeks, the deionized water was completely replaced with water having a temperature of 30° C., and the test piece was left for 15 minutes. Then, the test piece was taken out, dried off with a paper towel and maintained at 23° C.±2° C. at 50%±5% RH for 15 hours. The test piece was measured for a volume specific resistance with a vibrating read electrometer (TR-8401/8411, supplied by Takeda Riken Industry Co., Ltd.) to which TR-300C, TR-47 or TR-42 was connected.

The above measurement means that a test piece showing a high volume specific resistance has high electric insulation resistance when it is submerged.

(8) Content of water-soluble sodium salt in metal hydroxide: 10 Grams of magnesium hydroxide or aluminum hydroxide added to 100 ml of deionized water and the mixture was stirred at 30° C. for 96 hours. Then, the mixture was measured for eluted sodium by an atomic absorption method. A measured value is shown as a content of sodium.

10

EXAMPLE 1

Preparation of Base Material A-1, and Lamination of Base Material A-1 and Skin Layer B Components shown in Table 1 were mixed beforehand to prepare a base material composition, and the base material composition was extruded at 220° C. with a single-screw kneading extruder to obtain a homogeneous mixture. The homogeneous mixture was air-dried at 105° C. for 10 hours and then "blown-film" extruded at 220° C. by an inflation method to give a dark brown film base material A-1 having a thickness of 120 μm. The film was treated by corona discharging, and then, the following 80 μm thick white skin layer B-1 treated by corona discharging was laminated thereon with the following adhesive as described below, to give a laminated film having a thickness of 200 μm. The obtained film was measured or evaluated for a tensile strength at a breaking point, an elongation at a breaking point, flame retardancy, a surface whitening phenomenon, a color and an electric insulation resistance of a submerged molded article.

Laminating:

| Adhesive | SEIKA BOND E-263 | 100 parts by weight |
|---|---|---|
| | SEIKA BOND C-26 | 20 parts by weight |
| | (both supplied by Dainichi Seika Kogyo k.K.) | |
| | Ethyl acetate | 120 parts by weight |

An adhesive prepared by mixing the above components in the above mixing ratio was applied to the base material A-1 at a rate of 3.5 g/m², and then ethyl acetate was completely removed by hot air at 80° C. The skin layer B-1 was bonded to the base material A-1 at approximately 60° C. with a laminating machine, to give a laminated article (laminated film) having a thickness of 200 μm. Presumably because red phosphorus (NOVA EXCEL F-5) originally had an intense vermilion-like reddish color and had a particle diameter of as small as 1.6 μm, the base material containing a mixture thereof with carbon black showed the color of dark brown.

The components for the base material composition had the following specific properties.

Metallocene LLDPE: MFR 1.0 g/10 minutes, density 0.930, heavy duty packaging grade.

EVA resin: MFR 4.0 g/10 minutes, density 0.95, vinyl acetate content 25% by weight.

Polymer alloy compatibilizer: TUFTEC M-1943, supplied by Asahi Chemical Industry Co., Ltd.

Magnesium hydroxide: not surface-treated

Magnesium stearate: supplied by Seido Kagaku Kogyo K.K.

Red phosphorus: NOVA EXCEL F-5, supplied by Rin Kagaku Kogyo K.K.

Carbon black: Oil furnace method FEF

Antioxidant: IRGANOX 1010, supplied by Ciba Special Chemicals K.K.

Photo stabilizer: TINUVIN 622LD, supplied by Ciba Special Chemicals K.K.

Ultraviolet absorbent: TINUVIN 320, supplied by Ciba Special Chemicals K.K.

Skin layer B-1

A white film having a thickness of 80 μm was prepared in the same manner as in the preparation of the base material A-1 except that the red phosphorus, carbon black and antioxidant were excluded from a composition, that the amount of magnesium hydroxide was decreased to 50 parts by weight, that the amount of magnesium stearate was increased to 2.5 parts by weight and that 10 parts by weight of rutile type titanium oxide was newly added. The so-obtained film was used as a skin layer B-1. The skin layer B-1 was also treated by corona discharging.

EXAMPLES 2–5

Preparation of Base Materials A-2 to A-5 and Lamination thereof with Skin Layers B-2 to B-5

Components shown in Table 1 were used for base material compositions, and 120 μm thick films as base materials A-2 to A-4 and a 66 μm thick film as a base material A-5 were prepared from the above compositions in the same manner as in Example 1. Further, 80 μm thick films as skin layers B-2 to B-4 and 134 μm thick film as a skin layer B-5 were prepared in the same manner as in Example 1. These base materials and the skin layers were laminated and the laminated films were tested in the same manner as in Example 1.

However, the magnesium hydroxide used in Example 2 was prepared by surface-treating magnesium hydroxide with hot water containing 3 parts by weight, based on the magnesium hydroxide, of sodium stearate and having a temperature of 80° C., fully drying the surface-treated magnesium hydroxide, washing it with deionized water in an amount twice the weight of the surface-treated magnesium hydroxide, drying and pulverizing.

The magnesium hydroxide used in Example 3 was prepared as follows. Magnesium hydroxide was coated with an acid-resistance coating by treating it in hot water containing 0.3% by weight as $SiO_2$, based on the magnesium hydroxide, of a No. 3 water glass depolymerized in 1N hydrochloric acid and having a temperature of 80° C., and then the coated magnesium hydroxide was surface-treated in hot water containing 2% by weight, based on the magnesium hydroxide, of sodium stearate and having a temperature of 80° C. The surface-treated magnesium hydroxide was fully dehydrated, washed with deionized water in an amount 10 times the weight of the surface-treated magnesium hydroxide and dried and pulverized.

The magnesium hydroxide used in Example 4 was prepared by surface-treating magnesium hydroxide with 2.5% by weight of isopropyltrisostearoyl titanate in a composite solvent of triethanolamine and water and then treating the surface-treated magnesium hydroxide in the same manner as in Example 2.

The magnesium hydroxide in Example 5 was prepared by surface-treating magnesium hydroxide with a mixture containing 2.5% by weight of stearylphosphoric acid ester diethanolamine, 50% by weight of a diester of the formula (1),

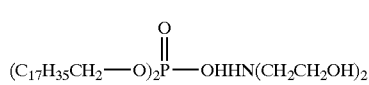
(1)

and 50% by weight of a monoeseter of the formula (2)

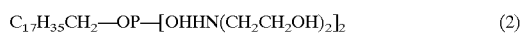
(2)

and having a temperature of 80° C., and then treating the surface-treated magnesium hydroxide in the same manner as in Example 2.

For the base materials of Examples 2 to 5, the same components as those in Example 1 other than the magnesium hydroxide were used in amount ratios shown in Table 1.

Preparation of Skin Layers B-2 to B-5

Compositions for the skin layers B-2 to B-5 were the same as those of the base materials A-2 to A-5 except for the following. That is, in the skin layers B-2 to B-5, red phosphorus and carbon black were excluded from the compositions of the base materials A-2 to A-5, the amount of magnesium hydroxide was decreased from 65 parts by weight to 50 parts by weight, and 10 parts by weight each of the following pigments were added.

B-2: Chrome Yellow
B-3: Reddish Chrome Yellow
B-4: Cadmium Yellow
B-5: Ultramarine The compositions for the skin layers B-2 to B-5 further newly contained 1.5 parts by weight of magnesium stearate each.

The skin layers B-2 to B-5 were prepared from the above compositions in the same manner as in the preparation of the skin layer B-1 and laminated on the base materials A-1 to A-5 in the same manner as in the lamination of the skin layer B-1 on the base material A-1.

TABLE 1

| Base material composition | A-1 | A-2 | A-3 | A-4 | A-5 |
|---|---|---|---|---|---|
| Base material A composition and Properties of magnesium hydroxide and red phosphorus | | | | | |
| Metallocene LLDPE | 85 | 70 | 85 | 85 | 85 |
| EVA resin | 5 | 5 | 5 | 5 | 5 |
| Polymer alloy compatibilizer | 10 | 25 | 10 | 10 | 10 |
| Magnesium hydroxide | 65 | 65 | 65 | 65 | 65 |
| Magnesium stearate | 1.5 | 0 | 0.5 | 0 | 0 |
| Red phosphorus | 11 | 11 | 11 | 11 | 11 |
| Carbon black | 4 | 4 | 4 | 4 | 4 |
| Antioxidant | 0.1 | 0.1 | 0.1 | 0.1 | 0.1 |
| Photo-stabilizer | 0.1 | 0.1 | 0.1 | 0.1 | 0.1 |
| Ultraviolet absorbent | 0.1 | 0.1 | 0.1 | 0.1 | 0.1 |

Note:
Values in the above Table show "parts by weight".

| Properties of magnesium hydroxide and red phosphorus | | | | | |
|---|---|---|---|---|---|
| BET specific surface area $m^2/g$ | 6.3 | 5.9 | 5.8 | 4.5 | 8.7 |
| Average particle diameter μm | 0.90 | 0.93 | 0.93 | 1.40 | 0.61 |
| Content of water-soluble NA ppm | 40 | 70 | 90 | 50 | 50 |
| Average particle diameter of red phosphorus μm | 1.6 | 1.6 | 1.6 | 1.6 | 1.6 |

TABLE 2

Properties of film molded article
(Laminated film of base material A and skin layer B)

| Example | 1 | 2 | 3 | 4 | 5 |
|---|---|---|---|---|---|
| Base material | A-1 | A-2 | A-3 | A-4 | A-5 |
| Thickness of base material μm | 120 | 120 | 120 | 120 | 66 |
| Skin layer | B-1 | B-2 | B-3 | B-4 | B-5 |
| Thickness of skin layer μm | 80 | 80 | 80 | 80 | 134 |

TABLE 2-continued

Properties of film molded article
(Laminated film of base material A and skin layer B)

| Example | 1 | 2 | 3 | 4 | 5 |
|---|---|---|---|---|---|
| Tensile strength at breaking point kgf/cm$^2$ | 2.00 | 2.25 | 1.95 | 1.97 | 2.41 |
| Elongation at breaking point % | 450 | 480 | 430 | 440 | 500 |
| Flame retardancy JIS D 1201 | self ext. | self-ext. | self-ext. | self-ext. | Dfd-fl. |
| Surface whitening phenomenon (grade) | 2 | 2 | 1 | 2 | 2 |
| Surface color of film molded article | white | yellow | orange | red | Blue |
| Electric insulation resistance Ω · cm | >1 × 10$^{13}$ | >1 × 10$^{13}$ | >1 × 10$^{13}$ | >1 × 10$^{13}$ | >1 × 10$^{13}$ |
| Lamination | Yes | Yes | Yes | Yes | Yes |

Notes:
Self-ext. = self-extinguishable,
Dfd-fl. = deferred flammability

Method of measuring electric insulation resistance: Twelve laminated films were stacked such that skin layers and base materials faced the same direction, i.e., so as to constitute a stack of base material/skin layer/base material/skin layer . . . , and these films were fused at 130° C. with a compression molding machine, to obtain a 24 mm thick test piece. The test piece was measured according to the above method (7).

Comparative Examples 1–3

A 200 μm thick film was prepared from a composition shown in Table 3 in the same manner as in Example 1. The film was measured for physical properties shown in Table 4 without forming a laminated molded article. However, the measurement of electric insulation resistance was as follows. Twelve films prepared in the same manner as above were stacked and fused at 130° C. with a compression molding machine to obtain a 2.4 mm thick test piece, and the test piece was measured. Comparative Examples 2 and 3 used the same magnesium hydroxide as that used in Example 1.

Comparative Examples 4 and 5

A 120 μm thick film was prepared from a composition Ax4 (Comparative Example 4) or Ax5 (Comparative Example 5) shown in Table 3 in the same manner as in Example 1, and the film was used as a base material. A skin layer By4 (Comparative Example 4) or a skin layer By5 (Comparative Example 5) was prepared in the same manner as in the preparation of the base material A-1 except that the red phosphorus, carbon black and antioxidant were excluded and that the amount of the magnesium hydroxide was reduced to 50 parts by weight, further that the amount of magnesium stearate was increased to 2.5 parts by weight in By4 or 1.5 parts by weight of magnesium stearate was added in By5, and that 10 parts by weight of rutile type titanium oxide was newly added in By4 or 10 parts by weight of chrome yellow was added in By5, whereby a 80 μm thick white or yellow film was obtained and used as the skin layer By4 or By5.

The base material Ax4 and the skin layer By4 were laminated, and the base material Ax5 and the skin layer By5 were laminated, in the same manner as in Example 1, to obtain 200 μm thick laminated films. Table 4 shows physical properties of the films. However, test pieces for measurement of electric insulation resistance were separately prepared in the same manner as in Example 1.

Comparative Example 4 used magnesium hydroxide which was not surface-treated.

Comparative Example 5 used magnesium hydroxide prepared by surface-treating magnesium hydroxide with 3 parts by weight, based on the magnesium hydroxide, of sodium stearate in hot water at 80° C., removing ½ of the hot water by dehydration after the surface treatment and drying the remainder off by evaporation.

TABLE 3

| | Comparative Example | | | | |
|---|---|---|---|---|---|
| Base material composition | 1 | 2 | 3 | Ax4 | Ax5 |

Composition and
Properties of magnesium hydroxide and red phosphorus

| | | | | | |
|---|---|---|---|---|---|
| Metallocene LLDPE | 85 | 85 | 85 | 85 | 70 |
| EVA resin | 5 | 5 | 5 | 5 | 5 |
| Polymer alloy compatibilizer | 10 | 10 | 10 | 10 | 25 |
| Magnesium hydroxide | 0 | 150 | 65 | 65 | 65 |
| Magnesium stearate | 0 | 3.5 | 1.5 | 1.5 | 0 |
| Red phosphorus | 0 | 0 | 11 | 11 | 11 |
| Carbon black | 0 | 0 | 4 | 4 | 4 |
| Antioxidant | 0.1 | 0.1 | 0.1 | 0.1 | 0.1 |
| Photo-stabilizer | 0.1 | 0.1 | 0.1 | 0.1 | 0.1 |
| Ultraviolet absorbent | 0.1 | 0.1 | 0.1 | 0.1 | 0.1 |

Note:
Units of values in the above Table are "parts by weight".

Properties of magnesium hydroxide and red phosphorus

| | | | | | |
|---|---|---|---|---|---|
| BET specific surface area m$^2$/g | — | 6.3 | 6.3 | 58 | 6.3 |
| Average particle diameter μm | — | 0.90 | 0.90 | 6.6 | 0.90 |
| Content of water-soluble Na ppm | — | 40 | 40 | 100 | 1,150 |
| Average particle diameter of red phosphorus μm | — | — | 1.6 | 1.6 | 60 |

TABLE 4

Properties of film molded article

| Comparative Example | 1 | 2 | 3 | 4 | 5 |
|---|---|---|---|---|---|
| Composition | 1 | 2 | 3 | — | — |
| Base material composition | — | — | — | Ax4 | Ax5 |
| Skin layer | — | — | — | By4 | By5 |
| Tensile strength at breaking point kgf/cm$^2$ | 4.25 | 1.22 | 1.82 | 1.27 | 1.30 |
| Elongation at breaking point % | 680 | 180 | 410 | 100 | 150 |

TABLE 4-continued

Properties of film molded article

| Comparative Example | 1 | 2 | 3 | 4 | 5 |
|---|---|---|---|---|---|
| Flame retardancy JIS D 1201 | Easily fl. | Dfd-fl. | self-ext. | self-ext. | Dfd-fl. |
| Surface whitening phenomenon (grade) | 1 | 4 | 2 | 5 | 5 |
| Surface color of molded article | transparent | white | dark brown | white | white |
| Electric insulation resistance Ω · cm | >1 × $10^{13}$ | >1 × $10^{13}$ | <1 × $10^{10}$ | <1 × $10^{10}$ | <1 × $10^{10}$ |
| Lamination | No | No | No | Yes | Yes |

Notes:
Self-ext. = self-extinguishable,
Dfd-fl. = deferred flammability
Easily-fl. = easily flammable

EXAMPLE 6

The skin layer B-1 of the same molded article as that obtained in Example 1 was treated by corona discharging beforehand, and 20 g of white nylon fibers having a length of 0.5 mm were implanted at 10 denier/1 m² by an electrostatic implanting method. The same adhesive as that used in Example 1 was used at a rate of 3.5 g/m². The molded article was measured for physical properties, and Table 5 shows the results.

Comparative Example 6

Fibers were implanted on the same molded article as that obtained in Comparative Example 3 in the same manner as in Example 6. White piles were implanted so that no whitening phenomenon inside was observed, while the surface color of the molded article was whitish brown, or the dark brown of the base material was not completely masked, and the molded article showed an electric insulation resistance of as low as less than 1×$10^{10}$ Ω.cm, so that the results were different from those in Example 6.

TABLE 5

Physical properties of fiber-implanted film molded article

| | Example 6 | Comparative Example 6 |
|---|---|---|
| Tensile strength at breaking point kgf/cm² | 1.85 | 1.82 |
| Elongation at breaking point % | 420 | 400 |
| Flame retardancy JIS D 1201 | Self-extinguishable | Self-extinguishable |
| Surface whitening phenomenon (grade) | 1 | 1 |
| Surface color of film molded article | white | whitish brown |
| Electric insulation resistance Ω · cm | >1 × $10^{13}$ | <1 × $10^{10}$ |
| Lamination | Yes | No |

Note:
Electric insulation resistance: One fiber-planted molded article was placed on 11 molded articles free of implanted fibers, the resultant laminate was fused at 130° C. with a compression molding machine to obtain a test piece retaining a velvet-like texture, and the test piece was measured for an electric insulation resistance.

EXAMPLE 7

Components for a composition for a base material A-7 and components for a composition for a skin layer B-7, shown in Table 6, were separately mixed to prepare mixtures in advance, the mixtures were separately kneaded at 230° C. with a twin-screw extruder to obtain homogeneous mixtures, and the mixtures were dried with hot air at 120° C. for 2 hours. Then, plates having a thickness of 2.1 mm or 2.9 mm were prepared from the composition for the base material A-7 with an injection molding machine, and films having a thickness of 0.15 mm were prepared from the composition for the skin layer B-7 by extrusion molding according to a T-die method. One of the films was placed on one surface of each of the plates, one of the films was placed on the other surface of each, and the resultant laminates were separately fused at 155° C. with a compression molding machine to obtain a 2.4 mm thick laminated board and 3.2 mm thick laminated board. Then, test pieces for testing physical property values shown in Table 7 were prepared and measured for physical properties.

In Table 6, polypropylene used for A-7 had a grade of injection molding, polypropylene used for B-7 shown had a film grade, and magnesium hydroxide was the same as that used for A-2. The other components were the same as those used in Example 1.

TABLE 6

Composition for base material A-7 and composition for skin layer B-7

| Base material/skin layer compositions | A-7 | B-7 |
|---|---|---|
| Polypropylene | 95 | 90 |
| EVA | 5 | 10 |
| Magnesium hydroxide | 70 | 0 |
| Red phosphorus | 12 | 0 |
| Carbon black | 5 | 0.005 |
| Antioxidant | 0.1 | 0.1 |
| Photo-stabilizer | 0.1 | 0.1 |
| Ultraviolet absorbent | 0.1 | 0.1 |

Note:
In Table, units of values are "parts by weight".

Comparative Example 7

The composition for base material A-7 was injection-molded to form non-laminated molded boards having a thickness of 2.4 mm or 4.2 mm, and test pieces for testing physical property values shown in Table 7 were prepared and measured for physical properties.

TABLE 7

|  | Example 7 | Comparative Example 7 |
|---|---|---|
| Tensile strength at breaking point kgf/cm$^2$ | 2.15 | 2.12 |
| Elongation at breaking point % | 200 | 180 |
| Flame retardancy UL94VE (thickness 3.2 mm) | V-0 | V-0 |
| Surface whitening phenomenon (grade) | 1 | 2 |
| Surface color of molded article | black | dark brown |
| Electric insulation resistance Ω · cm (thickness 2.4 mm) | >1 × 10$^{13}$ | <1 × 10$^{10}$ |
| Lamination | Yes | No |

EXAMPLE 8

Components for a composition for a base material A-8 and components for a composition for a skin layer B-8, shown in Table 8 were separately mixed in advance, and the mixtures were separately kneaded at 230° C. with a twin-screw extruder to obtain homogeneous mixtures. Each mixture was vacuum-dried at 70° C. for 16 hours, and a molded board having a thickness of 5.6 mm was prepared from the composition for a base material A-8 at 230° C., and molded boards having a thickness of 0.4 mm were prepared from the composition for a skin layer B-8 at 230° C. One of the 0.4 mm thick boards was placed on one surface of the 5.6 mm board, and one of the 0.4 mm thick boards was placed on the other surface of the 5.6 mm board, and the resultant laminate was fused at 110° C. with a compression molding machine to obtain a board having a thickness of 6.4 mm. Test pieces for tests shown in Table 9 were prepared from the above board, and measured for physical properties.

The ABS resin had the grade of impact resistance, and the magnesium hydroxide was the same as that used in the preparation of the base material A-2. The red phosphorus was "NOVA EXCEL 140" having an average secondary particle diameter of 25 μm, supplied by Rin Kagaku Kogyo. The other components were the same as those used in Example 1. The NOVA EXCEL 140 had a low tinting strength presumably because it originally had the color of dark red and had a particle diameter of as large as 25 μm, so that the base material was black due to the intense exhibition of the color of carbon black.

TABLE 8

Composition for base material A-8 and composition for skin layer B-8

| Base material/skin layer compositions | A-8 | B-8 |
|---|---|---|
| ABS resin | 100 | 100 |
| Magnesium hydroxide | 20 | 50 |
| Red phosphorus | 10 | 0 |
| Carbon black | 8 | 0 |
| Antioxidant | 0.1 | 0.1 |
| Photo-stabilizer | 0.1 | 0.1 |
| Ultraviolet absorbent | 0.1 | 0.1 |

Note:
In Table, units of values are "parts by weight".

Comparative Example 8

The composition for base material A-8 was compression-molded to form non-laminated molded boards having a thickness of 6.4 mm, and test pieces for testing physical property values shown in Table 9 were prepared and measured for physical properties.

TABLE 9

|  | Example 8 | Comparative Example 8 |
|---|---|---|
| Tensile strength at breaking point kgf/cm$^2$ | 4.15 | 4.12 |
| Elongation at breaking point % | 10 | 8 |
| Flame retardancy UL94HB (thickness 6.4 mm) | Excellent | Excellent |
| Surface whitening phenomenon (grade) | 2 | 2 |
| Surface color of molded article | white | black |
| Electric insulation resistance Ω · cm (thickness 2.4 mm) | >1 × 10$^{13}$ | <1 × 10$^{10}$ |
| Lamination | Yes | No |

EXAMPLE 9

Components for a composition for a base material A-9 and components for a composition for a skin layer B-9, shown in Table 10, were separately mixed in advance, and the mixtures were separately kneaded at 120° C. with a single-screw extruder to obtain homogeneous mixtures. Each mixture was vacuum-dried at 50° C. for 16 hours. The homogeneous mixture for a base material A-9 was pre-molded with a compression molding machine at 120° C. for 5 minutes and crosslinked with the compression molding machine at 180° C. for 15 minutes, to obtain a molded board having a thickness of 2.9 mm. Separately, 150 μm thick films were prepared from the homogeneous mixture for a skin layer B-9 at 200° C. by a T-die method.

One of the 150 μm thick films was placed on one surface of the above molded board (base material A-9), one of the 150 μm thick films was placed on the other surface, and the resultant laminate was fused at 80° C. with a compression molding machine to obtain a board having a thickness of 3.2 mm.

In the above compositions, the EEA resin had an ethyl acrylate content of 15% by weight, the magnesium hydroxide was the same as that used in the preparation of A-2, and the red phosphorus and the carbon black were the same as those used in the preparation of A-8. The titanium oxide was a rutile type titanium oxide, and the dicumyl peroxide was a commercial product, Mitsui DPC, supplied by Mitsui Petrochemical Industries, Ltd. The other components were the same as those used in Example 1.

TABLE 10

Composition for base material A-9 and composition for skin layer B-9

| Base material/skin layer compositions | A-9 | B-9 |
|---|---|---|
| EEA resin | 100 | 100 |
| Magnesium hydroxide | 80 | 0 |
| Red phosphorus | 10 | 0 |
| Carbon black | 8 | 0 |
| Titanium oxide | 0 | 5 |
| Magnesium stearate | 0.3 | 0.3 |
| Dicumyl peroxide | 2.0 | 0 |
| Antioxidant | 0.1 | 0.1 |
| Photo-stabilizer | 0.1 | 0.1 |
| Ultraviolet absorbent | 0.1 | 0.1 |

Note:
In Table, units of values are "parts by weight".

Comparative Example 9

The composition for base material A-9 was pre-molded at 120° C. for 5 minutes and crosslinked at 180° C. for 15 minutes to obtain a non-laminated molded board having a thickness of 3.2 mm, and test pieces for testing physical property values shown in Table 11 were prepared and measured for physical properties.

TABLE 11

|  | Example 9 | Comparative Example 9 |
|---|---|---|
| Tensile strength at breaking point kgf/cm$^2$ | 1.50 | 1.35 |
| Elongation at breaking point % | 480 | 460 |
| Flame retardancy UL94HB (thickness 3.2 mm) | Excellent | Excellent |
| Surface whitening phenomenon (grade) | 1 | 3 |
| Surface color of molded article | white | black |
| Electric insulation resistance Ω · cm (thickness 2.4 mm) | >1 × 10$^{13}$ | <1 × 10$^{10}$ |
| Lamination | Yes | No |

EXAMPLE 10

A base material composition A-10 containing the following components was prepared, and a skin layer composition B-10 was prepared which was the same as the base material composition A-10 except that the red phosphorus and carbon black were excluded and that 1 part by weight of anatase type titanium oxide was added. Each composition was kneaded at 70° C. with an open roll, and after 1 day, each kneaded composition was vulcanized at 160° C. for 30 minutes. The base material composition A-10 was molded into a 4.4 mm thick plate, and the skin layer composition B-10 was molded into 1 mm thick plates. One of the 1 mm thick plates was bonded to one surface of the 4.4 mm thick plate, and one of the 1 mm thick plates was bonded to the other surface, with the same adhesive as that used in Example 1, to obtain a molded board having a thickness of 6.4 mm. A test piece for UL94HB was prepared from the above molded board, and a UL94HB test at a thickness of 6.4 mm was carried out. As a result, the board was excellent.

Base material composition A-10

| DPDM rubber (ethylene/propylene molar ratio = 50/50) | 100 parts by weight |
|---|---|
| Magnesium hydroxide (A-2) | 80 parts by weight |
| Dicumyl peroxide | 2 parts by weight |
| Poly(2,2,di-trimethyl-1,2-dihydroquinoline) | 0.5 part by weight |
| Silane coupling agent ("A-172" supplied by Nippon Unicar Ltd.) | 1 part by weight |
| Stearic acid | 1 part by weight |
| Red phosphorus ("Nova Excel 140" supplied by Rin Kagaku Kogyo K.K.) | 10 parts by weight |
| Carbon black (oil furnace method FEF) | 1 part by weight |

EXAMPLE 11

A base material composition A-11 containing the following components was prepared, and a skin layer composition B-11 was prepared which was the same as the base material composition A-11 except that the red phosphorus and carbon black were excluded and that 1 part by weight of anatase type titanium oxide was added. Each composition was kneaded at approximately 30° C. with a kneader. Each kneaded composition was cured at 90° C. for 15 minutes. The base material composition A-11 was molded into a 4.4 mm thick plate, and the skin layer composition B-11 was molded into 1 mm thick plates. One of the 1 mm thick plates was bonded to one surface of the 4.4 mm thick plate, and one of the 1 mm thick plates was bonded to the other surface, with the same adhesive as that used in Example 1, to obtain a molded board having a thickness of 6.4 mm. A test piece for UL94HB was prepared from the above molded board, and a UL94HB test at a thickness of 6.4 mm was carried out. As a result, the board was excellent.

Base material composition A-11

| Epoxy resin (specific gravity 1.17) | 100 parts by weight |
|---|---|
| Aluminum hydroxide (Average particle diameter 0.7 μm, a water-soluble sodium content 50 ppm, BET specific surface area 8.0 m$^2$/g) | 80 parts by weight |
| Red phosphorus ("Nova Excel 140" supplied by Rin Kagaku Kogyo K.K.) | 10 parts by weight |
| Carbon black (oil furnace method FEF) | 1 part by weight |
| Curing agent ("HY-951" supplied by Ciba Geigy) | 10 parts by weight |
| Stearic acid | 2 parts by weight |
| Irganox 1010 | 0.2 part by weight |

EFFECT OF THE INVENTION

According to the present invention, there is provided a halogen-free molded article which can be colored in any color, which has high strength and high flame retardancy and which is almost free from a decrease in electric insulation resistance when submerged. The molded article of the present invention can be used as required in fields where conventional molded articles of synthetic resins containing metal hydroxide, red phosphorus and carbon black have a coloring problem and conventional molded articles when submerged cause the problem of a decrease in electric insulation resistance.

What is claimed is:

1. A flame-retardant resin molded article, comprising a base material A and a skin layer B laminated thereon,
   wherein the base material A is a molded product formed of a composition containing 100 parts by weight of a synthetic resin, 5 to 200 parts by weight of magnesium hydroxide, 1 to 30 parts by weight of red phosphorus and 0.1 to 30 parts by weight of a carbon powder, and
   the skin layer B is a molded product, which can be internally colored any color, formed of a composition consisting essentially of 100 parts by weight of a synthetic resin, 0 to 100 parts by weight of a pigment and 0 to 200 parts by weight of magnesium hydroxide, provided that the total amount of the pigment and the magnesium hydroxide in the skin layer B is at least 0.001 part by weight and wherein said skin layer B does not contain any red phosphorus.

2. The molded article according to claim 1, wherein the skin layer B is 3 times or less than 3 times as thick as the base material A.

3. The molded article comprising the molded article recited in claim 1 and short fibers of a synthetic fiber and/or a natural fiber implanted in the molded article recited in claim 1.

4. The molded article according to claim 1, wherein the base material A is a molded article formed of a composition containing 100 parts by weight of the synthetic resin, 10 to 100 parts by weight of the magnesium hydroxide, 5 to 15 parts by weight of the red phosphorus and 1 to 10 parts by weight of the carbon powder.

5. The molded article according to claim 1, wherein the skin layer B is a molded article formed of 100 parts by weight of the synthetic resin, 1 to 20 parts by weight of the pigment and 10 to 100 parts by weight of the magnesium hydroxide.

6. The molded article according to claim 1, wherein the magnesium hydroxide has a BET specific surface area of 1 to 30 m²/g, an average secondary particle diameter, measured by a laser diffraction scattering method, of 0.3 to 10 µm and a water-soluble sodium salt content of 500 ppm or less as sodium.

7. The molded article according to claim 1, wherein the magnesium hydroxide has a BET specific surface area of 3 to 10 m²/g, an average secondary particle diameter, measured by a laser diffraction scattering method, of 0.5 to 1.5 µm and a water-soluble sodium salt content of 100 ppm or less as sodium.

8. The molded article according to claim 1, wherein the magnesium hydroxide is surface-treated with at least one member selected from the group consisting of higher fatty acids, a silane coupling agent, a titanate coupling agent, an aluminate coupling agent and alcohol phosphoric acid esters. recited in claim 1.

9. The molded article according to claim 1, wherein the magnesium hydroxide satisfies any of the following requirements:
   a) has a BET specific surface area of 1 to 30 m²/g, an average secondary particle diameter, measured by a laser diffraction scattering method, of 0.3 to 10 µm and a water-soluble sodium salt content of 500 ppm or less as sodium,
   b) has a BET specific surface area of 3 to 10 m²/g, an average secondary particle diameter, measured by a laser diffraction scattering method, of 0.5 to 1.5 µm and a water-soluble sodium salt content of 100 ppm or less as sodium,
   c) is surface-treated with at least one member selected from the group consisting of higher fatty acids, a silane coupling agent, a titanate coupling agent, an aluminate coupling agent and alcohol phosphoric acid esters.

10. The molded article according to claim 9, wherein the magnesium hydroxide is provided with an acid-resistant coating formed of at least one member selected from the group consisting of a silicon compound, a boron compound and an aluminum compound.

11. The molded article according to claim 1, wherein the red phosphorus has an average secondary diameter, measured by a laser diffraction scattering method, of 50 µm or less.

12. The molded article according to claim 1, wherein the red phosphorus has an average secondary diameter, measured by a laser diffraction scattering method, of 5 µm or less.

13. The molded article according to claim 1, wherein the carbon powder contained in the base material A is carbon black.

14. The molded article according to claim 1, wherein the pigment contained in the skin layer B is at least one member selected from the group consisting of a white pigment, a black pigment, yellow pigment, an orange pigment, a red pigment, a violet pigment, a blue pigment, a green pigment and a metal powder pigment.

15. The molded article according to claim 1, wherein the synthetic resin contained in the base material A and/or the skin layer B is a polyolefin resin or a polystyrene resin.

16. The molded article according to claim 1, wherein the synthetic resin contained in the base material A and/or the skin layer B contains 50 parts by weight or less, per 100 parts by weight of the synthetic resin, of a polymer alloy compatibilizer.

17. The molded article according to claim 1, which shows a volume specific resistance of at least $1 \times 10^{10}$ Ω.cm when the molded article is submerged in deionized water at 90° C. for 10 weeks.

18. The molded article according to claim 1, which shows a volume specific resistance of at least $1 \times 10^{13}$ Ω.cm when the molded article is submerged in deionized water at 90° C. for 10 weeks.

* * * * *